US007712917B2

(12) United States Patent
Roberts et al.

(10) Patent No.: US 7,712,917 B2
(45) Date of Patent: May 11, 2010

(54) SOLID STATE LIGHTING PANELS WITH LIMITED COLOR GAMUT AND METHODS OF LIMITING COLOR GAMUT IN SOLID STATE LIGHTING PANELS

(75) Inventors: John K. Roberts, Grand Rapids, MI (US); Keith J. Vadas, Coopersville, MI (US)

(73) Assignee: Cree, Inc., Durham, NC (US)

( * ) Notice: Subject to any disclaimer, the term of this patent is extended or adjusted under 35 U.S.C. 154(b) by 199 days.

(21) Appl. No.: 11/751,263

(22) Filed: May 21, 2007

(65) Prior Publication Data

US 2008/0291669 A1 Nov. 27, 2008

(51) Int. Cl.
*B60Q 1/26* (2006.01)

(52) U.S. Cl. ....................... 362/227; 362/601; 362/602; 362/630

(58) Field of Classification Search ................. 362/227, 362/601, 602, 630
See application file for complete search history.

(56) References Cited

U.S. PATENT DOCUMENTS 4,329,625 A 5/1982 Nishizawa et al.
5,783,909 A 7/1998 Hochstein
5,959,316 A 9/1999 Lowery
6,069,676 A * 5/2000 Yuyama ....................... 349/62
6,078,148 A 6/2000 Hochstein
6,127,784 A 10/2000 Grossman et al.
6,153,985 A 11/2000 Grossman
6,236,331 B1 5/2001 Dussureault
6,285,139 B1 9/2001 Ghanem
6,350,041 B1 2/2002 Tarsa et al.
6,362,578 B1 3/2002 Swanson et al.
6,411,046 B1 6/2002 Muthu
6,441,558 B1 8/2002 Muthu et al.
6,495,964 B1 12/2002 Muthu et al.
6,498,440 B2 12/2002 Stam et al.
6,510,995 B2 1/2003 Muthu et al.
6,576,881 B2 6/2003 Muthu et al.

(Continued)

FOREIGN PATENT DOCUMENTS

EP 1 564 821 A1 8/2005

(Continued)

OTHER PUBLICATIONS

U.S. Appl. No. 11/601,500, filed Nov. 17, 2006, Roberts et al.

(Continued)

*Primary Examiner*—Sandra L O'Shea
*Assistant Examiner*—Meghan K Dunwiddie
(74) *Attorney, Agent, or Firm*—Myers Bigel Sibley & Sajovec

(57) ABSTRACT

Methods of controlling a backlight unit including a plurality of solid state light emitting devices include receiving a request to set a color point of the backlight unit at a requested color point, and determining if the requested color point is within an acceptable range. In response to the requested color point being outside the acceptable range, a modified color point is selected in response to the requested color point, and a color point of the backlight unit is set at the modified color point. Corresponding solid state lighting units are also disclosed.

24 Claims, 10 Drawing Sheets

U.S. PATENT DOCUMENTS

| | | | | |
|---|---|---|---|---|
| 6,576,930 | B2 | 6/2003 | Reeh et al. | |
| 6,611,000 | B2 * | 8/2003 | Tamura et al. | 257/80 |
| 6,630,801 | B2 | 10/2003 | Schuurmans | |
| 6,674,060 | B2 | 1/2004 | Antila | |
| 6,741,351 | B2 | 5/2004 | Marshall et al. | |
| 6,809,347 | B2 | 10/2004 | Tasch et al. | |
| 6,836,081 | B2 | 12/2004 | Swanson et al. | |
| 6,841,804 | B1 | 1/2005 | Chen et al. | |
| 6,841,947 | B2 | 1/2005 | Berg-johansen | |
| 6,936,857 | B2 | 8/2005 | Doxsee et al. | |
| 7,009,343 | B2 | 3/2006 | Lim et al. | |
| 7,023,543 | B2 | 4/2006 | Cunningham | |
| 7,135,664 | B2 | 11/2006 | Vornsand et al. | |
| 7,140,752 | B2 | 11/2006 | Ashdown | |
| 7,173,384 | B2 | 2/2007 | Plotz et al. | |
| 7,186,000 | B2 | 3/2007 | Lebens et al. | |
| 7,202,608 | B2 | 4/2007 | Robinson et al. | |
| 7,208,713 | B2 | 4/2007 | Ishiguchi | |
| 7,213,940 | B1 | 5/2007 | Van De Ven et al. | |
| 7,256,557 | B2 | 8/2007 | Lim et al. | |
| 2002/0190972 | A1 | 12/2002 | Ven de Van | |
| 2003/0089918 | A1 | 5/2003 | Hiller et al. | |
| 2006/0105482 | A1 | 5/2006 | Alferink et al. | |
| 2007/0247414 | A1 | 10/2007 | Roberts | |

FOREIGN PATENT DOCUMENTS

| | | | |
|---|---|---|---|
| EP | 1 622 427 | A2 | 2/2006 |
| EP | 1 628 286 | A2 | 2/2006 |
| WO | WO 03/037042 | A1 | 5/2003 |
| WO | WO 2007/061758 | A1 | 5/2007 |
| WO | WO 2007/141748 | A1 | 12/2007 |

OTHER PUBLICATIONS

International Search Report and Written Opinion (14 pages) corresponding to International Application No. PCT/US2008/005823; Mailing Date: Oct. 10, 2008.

Perduijn et al, "Light Output Feedback Solution for RGB LED Backlight Applications", SID 2003 Digest 43.2/A.

Zhu et al., "Optimizing the Performance of Remote Phosphor LED, First International Conference on White LEDs and Solid State Lighting", 5 pages, Japan (Nov. 26-30, 2007).

International Search Report and Written Opinion (9 pages) corresponding to International Application No. PCT/US07/12707; Mailing Date: Aug. 21, 2008.

U.S. Appl. No. 11/755,149, May 30, 2007, Van De Ven.

U.S. Appl. No. 12/257,804, Oct. 24, 2008, Negley.

* cited by examiner

SOLID STATE LIGHTING PANELS WITH LIMITED COLOR GAMUT AND METHODS OF LIMITING COLOR GAMUT IN SOLID STATE LIGHTING PANELS

FIELD OF THE INVENTION

The present invention relates to solid state lighting, and more particularly to adjustable solid state lighting panels and to systems and methods for adjusting the light output of solid state lighting panels.

BACKGROUND

Solid state lighting arrays are used for a number of lighting applications. For example, solid state lighting panels including arrays of solid state lighting devices have been used as direct illumination sources, such as in architectural and/or accent lighting. A solid state lighting device may include, for example, a packaged light emitting device including one or more light emitting diodes (LEDs). Inorganic LEDs typically include semiconductor layers forming p-n junctions. Organic LEDs (OLEDs), which include organic light emission layers, are another type of solid state light emitting device. Typically, a solid state light emitting device generates light through the recombination of electronic carriers, i.e. electrons and holes, in a light emitting layer or region.

Solid state lighting panels are commonly used as backlights for small liquid crystal display (LCD) display screens, such as LCD display screens used in portable electronic devices. In addition, there has been increased interest in the use of solid state lighting panels as backlights for larger displays, such as LCD television displays.

For smaller LCD screens, backlight assemblies typically employ white LED lighting devices that include a blue-emitting LED coated with a wavelength conversion phosphor that converts some of the blue light emitted by the LED into yellow light. The resulting light, which is a combination of blue light and yellow light, may appear white to an observer. However, while light generated by such an arrangement may appear white, objects illuminated by such light may not appear to have a natural coloring, because of the limited spectrum of the light. For example, because the light may have little energy in the red portion of the visible spectrum, red colors in an object may not be illuminated well by such light. As a result, the object may appear to have an unnatural coloring when viewed under such a light source.

The color rendering index of a light source is an objective measure of the ability of the light generated by the source to accurately illuminate a broad range of colors. The color rendering index ranges from essentially zero for monochromatic sources to nearly 100 for incandescent sources. Light generated from a phosphor-based solid state light source may have a relatively low color rendering index.

For large-scale backlight and illumination applications, it is often desirable to provide a lighting source that generates a white light having a high color rendering index, so that objects and/or display screens illuminated by the lighting panel may appear more natural. Accordingly, such lighting sources may typically include an array of solid state lighting devices including red, green and blue light emitting devices. When red, green and blue light emitting devices are energized simultaneously, the resulting combined light may appear white, or nearly white, depending on the relative intensities of the red, green and blue sources. There are many different hues of light that may be considered "white." For example, some "white" light, such as light generated by sodium vapor lighting devices, may appear yellowish in color, while other "white" light, such as light generated by some fluorescent lighting devices, may appear more bluish in color.

The chromaticity of a particular light source may be referred to as the "color point" of the source. For a white light source, the chromaticity may be referred to as the "white point" of the source. The white point of a white light source may fall along a locus of chromaticity points corresponding to the color of light emitted by a black-body radiator heated to a given temperature. Accordingly, a white point may be identified by a correlated color temperature (CCT) of the light source, which is the temperature at which the heated black-body radiator matches the hue of the light source. White light typically has a CCT of between about 4000K and 8000K. White light with a CCT of 4000K has a yellowish color, while light with a CCT of 8000K is more bluish in color.

For larger display and/or illumination applications, multiple solid state lighting tiles may be connected together, for example, in a two dimensional array, to form a larger lighting panel. Unfortunately, however, the hue of white light generated may vary from tile to tile, and/or even from lighting device to lighting device. Such variations may result from a number of factors, including variations of intensity of emission from different LEDs, and/or variations in placement of LEDs in a lighting device and/or on a tile. Accordingly, in order to construct a multi-tile display panel that produces a consistent hue of white light from tile to tile, it may be desirable to measure the hue and saturation, or chromaticity, of light generated by a large number of tiles, and to select a subset of tiles having a relatively close chromaticity for use in the multi-tile display. This may result in decreased yields and/or increased inventory costs for a manufacturing process.

Moreover, even if a solid state display/lighting tile has a consistent, desired hue of light when it is first manufactured, the hue and/or brightness of solid state devices within the tile may vary non-uniformly over time and/or as a result of temperature variations, which may cause the overall color point of the panel to change over time and/or may result in non-uniformity of color across the panel. In addition, a user may wish to change the light output characteristics of a display panel in order to provide a desired hue and/or brightness level.

SUMMARY

Some embodiments of the invention provide methods of controlling a backlight unit including a plurality of solid state light emitting devices. The methods include receiving a request to set a color point of the backlight unit at a requested color point, and determining if the requested color point is within an acceptable range. In response to the requested color point being outside the acceptable range, a modified color point is selected in response to the requested color point, and a color point of the backlight unit is set at the modified color point.

The acceptable range may be defined with reference to a two-dimensional color space. For example, the acceptable range may be defined as a rectangle within the two-dimensional color space.

The color space may be represented by a 1931 CIE chromaticity diagram, and the acceptable range may be defined as a chromaticity point having coordinates (x,y), where $xlim1 \leqq x \leqq xlim2$ and $ylim1 \leqq y \leqq ylim2$. In some embodiments, the color space may be defined as $0.26 \leqq x \leqq 0.38$ and $0.26 \leqq y \leqq 0.38$.

The methods may further include determining if an x-coordinate of the requested color point falls within an acceptable range of x-coordinates. If the x-coordinate of the requested color point does not fall within the acceptable range of x-coordinates, the x-coordinate of the modified color point may be set as the closest x-coordinate in the range of acceptable x-coordinates to the x-coordinate of the requested color point.

The methods may further include determining if a y-coordinate of the requested color point falls within an acceptable range of y-coordinates. If the y-coordinate of the requested color point does not fall within the acceptable range of x-coordinates, the y-coordinate of the modified color point may be set as the closest y-coordinate in the range of acceptable y-coordinates to the y-coordinate of the requested color point.

The acceptable range may include color points within a distance r from a reference color point. Selecting the modified color point may include translating the requested color point along a line between the modified color point and the reference color point until the translated color point falls within the acceptable range.

The acceptable range may be defined as including color points falling within a region described by a regular or irregular polygon. Selecting the modified color point may include translating the requested color point toward a closest point on a surface of the polygon until the translated color point falls within the acceptable range. In some embodiments, selecting the modified color point may include translating the requested color point toward a reference color point until the translated color point falls within the acceptable range.

The acceptable range may be defined as color points that are within a predetermined distance from a blackbody radiation curve. Selecting the modified color point may include translating the requested color point toward a closest point on the blackbody radiation curve until the translated color point falls within the acceptable range. In some embodiments, selecting the modified color point may include translating the requested color point toward a reference color point until the translated color point falls within the acceptable range.

A solid state backlight unit according to some embodiments of the invention includes a lighting panel including a plurality of solid state light emitting devices, and a controller configured to control light output of the solid state light emitting devices. The controller is further configured to receive a requested color point for the lighting panel, to determine if the requested color point is within an acceptable range, to select a modified color point in response to the requested color point being outside the acceptable range, and to set a color point of the backlight unit at the modified color point.

The solid state backlight unit may further include a photosensor configured to measure a light output of the lighting panel and to provide the light output measurement to the controller in a closed loop control system.

The acceptable range may be defined to include a circle and/or a polygon within a two-dimensional color space.

The controller may be configured to select the modified color point by translating the requested color point toward a closest point of the polygon and/or circle until the translated color point falls within the acceptable range.

In some embodiments, the controller may be configured to select the modified color point by translating the requested color point toward a reference color point until the translated color point falls within the acceptable range.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
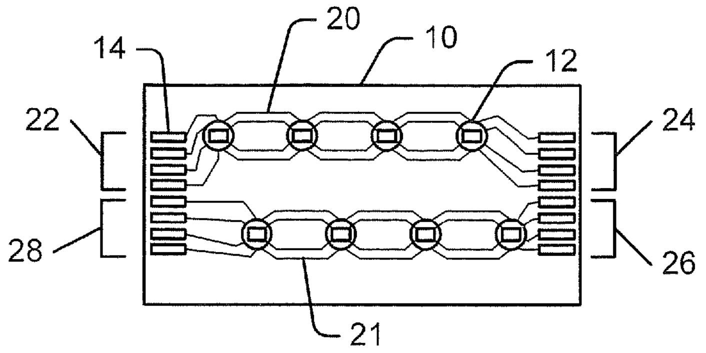
FIG. 1 is a front view of a solid state lighting tile in accordance with some embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to flowchart illustrations and/or block diagrams of methods, systems and computer program products according to embodiments of the invention. It will be understood that some blocks of the flowchart illustrations and/or block diagrams, and combinations of some blocks in the flowchart illustrations and/or block diagrams, can be implemented by computer program instructions. These computer program instructions may be stored or implemented in a microcontroller, microprocessor, digital signal processor (DSP), field programmable gate array (FPGA), a state machine, programmable logic controller (PLC) or other processing circuit, general purpose computer, special purpose computer, or other programmable data processing apparatus such as to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Referring now to FIG. 1, a solid state lighting tile 10 may include thereon a number of solid state lighting elements 12 arranged in a regular and/or irregular two dimensional array. The tile 10 may include, for example, a printed circuit board (PCB) on which one or more circuit elements may be mounted. In particular, a tile 10 may include a metal core PCB (MCPCB) including a metal core having thereon a polymer coating on which patterned metal traces (not shown) may be formed. MCPCB material, and material similar thereto, is commercially available from, for example, The Bergquist Company. The PCB may further include heavy clad (4 oz. copper or more) and/or conventional FR-4 PCB material with thermal vias. MCPCB material may provide improved thermal performance compared to conventional PCB material. However, MCPCB material may also be heavier than conventional PCB material, which may not include a metal core.

In the embodiments illustrated in FIG. 1, the lighting elements 12 are multi-chip clusters of four solid state emitting devices per cluster. In the tile 10, four lighting elements 12 are serially arranged in a first path 20, while four lighting elements 12 are serially arranged in a second path 21. The lighting elements 12 of the first path 20 are connected, for example via printed circuits, to a set of four anode contacts 22 arranged at a first end of the tile 10, and a set of four cathode contacts 24 arranged at a second end of the tile 10. The lighting elements 12 of the second path 21 are connected to a set of four anode contacts 26 arranged at the second end of the tile 10, and a set of four cathode contacts 28 arranged at the first end of the tile 10.

Figure 2:
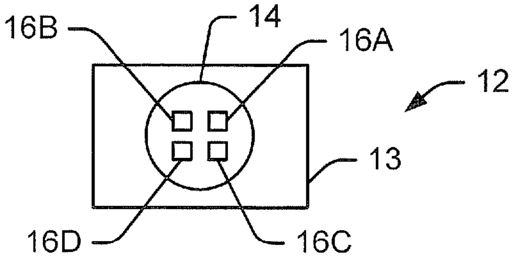
FIG. 2 is a top view of a packaged solid state lighting device including a plurality of LEDs in accordance with some embodiments of the invention.

The solid state lighting elements 12 may include, for example, organic and/or inorganic light emitting devices. An exemplary solid state lighting element 12' for high power illumination applications is illustrated in FIG. 2. A solid state lighting element 12' may comprise a packaged discrete electronic component including a carrier substrate 13 on which a plurality of LED chips 16A-16D are mounted. In other embodiments, one or more solid state lighting elements 12 may comprise LED chips 16A-16D mounted directly onto electrical traces on the surface of the tile 10, forming a multi-chip module or chip on board assembly. Suitable tiles are disclosed in commonly assigned U.S. patent application Ser. No. 11/601,500 entitled “SOLID STATE BACKLIGHTING UNIT ASSEMBLY AND METHODS” filed Nov. 17, 2006, the disclosure of which is incorporated herein by reference.

The LED chips 16A-16D may include at least a red LED 16A, a green LED 16B and a blue LED 16C. The blue and/or green LEDs may be InGaN-based blue and/or green LED chips available from Cree, Inc., the assignee of the present invention. The red LEDs may be, for example, AlInGaP LED chips available from Epistar Corporation, Osram Opto Semiconductors GmbH, and others. The lighting device 12 may include an additional green LED 16D in order to make more green light available.

In some embodiments, the LEDs 16A-16D may have a square or rectangular periphery with an edge length of about 900 μm or greater (i.e. so-called “power chips.” However, in other embodiments, the LED chips 16A-16D may have an edge length of 500 μm or less (i.e. so-called “small chips”). In particular, small LED chips may operate with better electrical conversion efficiency than power chips. For example, green LED chips with a maximum edge dimension less than 500 microns and as small as 260 microns, commonly have a higher electrical conversion efficiency than 900 micron chips, and are known to typically produce 55 lumens of luminous flux per Watt of dissipated electrical power and as much as 90 lumens of luminous flux per Watt of dissipated electrical power.

As further illustrated in FIG. 2, the LEDs 16A-16D may be covered by an encapsulant 14, which may be clear and/or may include light scattering particles, phosphors, and/or other elements to achieve a desired emission pattern, color and/or intensity. While not illustrated in FIG. 2, the lighting device 12 may further include a reflector cup surrounding the LEDs 16A-16D, a lens mounted above the LEDs 16A-16D, one or more heat sinks for removing heat from the lighting device, an electrostatic discharge protection chip, and/or other elements.

Figure 3:
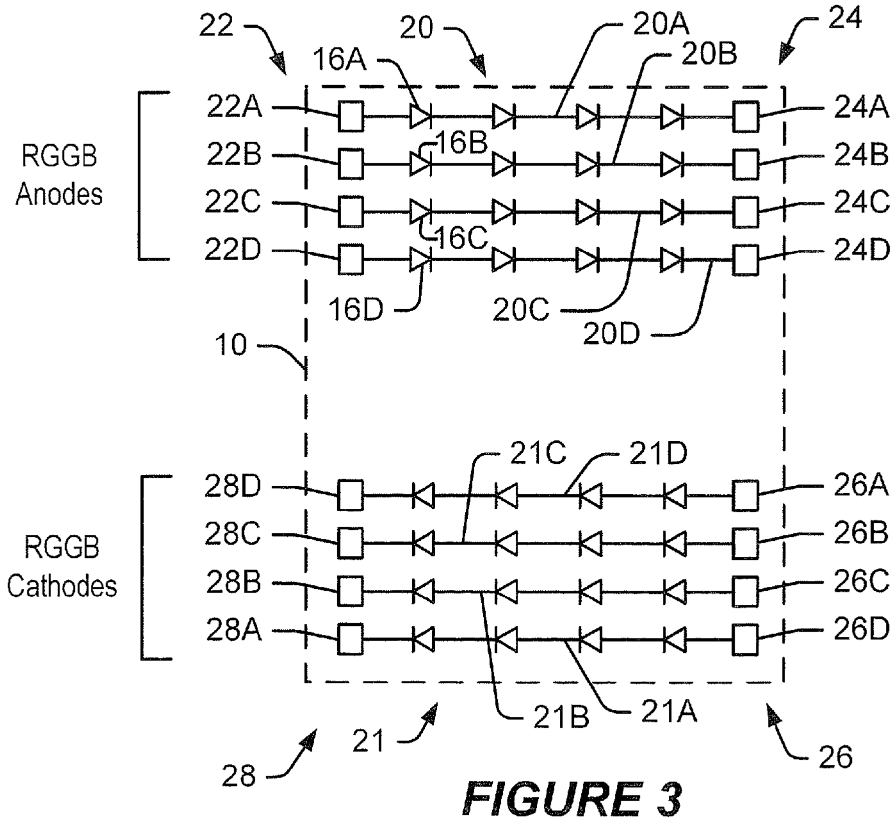
FIG. 3 is a schematic circuit diagram illustrating the electrical interconnection of LEDs in a solid state lighting tile in accordance with some embodiments of the invention.

LED chips 16A-16D of the lighting elements 12 in the tile 10 may be electrically interconnected as shown in the schematic circuit diagram in FIG. 3. As shown therein, the LEDs may be interconnected such that the blue LEDs 16A in the first path 20 are connected in series to form a string 20A. Likewise, the first green LEDs 16B in the first path 20 may be arranged in series to form a string 20B, while the second green LEDs 16D may be arranged in series to form a separate string 20D. The red LEDs 16C may be arranged in series to form a string 20C. Each string 20A-20D may be connected to an anode contact 22A-22D arranged at a first end of the tile 10 and a cathode contact 24A-24D arranged at the second end of the tile 10, respectively.

A string 20A-20D may include all, or less than all, of the corresponding LEDs in the first path 20 or the second path 21. For example, the string 20A may include all of the blue LEDs from all of the lighting elements 12 in the first path 20. Alternatively, a string 20A may include only a subset of the corresponding LEDs in the first path 20. Accordingly the first path 20 may include four serial strings 20A-20D arranged in parallel on the tile 10.

The second path 21 on the tile 10 may include four serial strings 21A, 21B, 21C, 21D arranged in parallel. The strings 21A to 21D are connected to anode contacts 26A to 26D, which are arranged at the second end of the tile 10 and to cathode contacts 28A to 28D, which are arranged at the first end of the tile 10, respectively.

It will be appreciated that, while the embodiments illustrated in FIGS. 1-3 include four LED chips 16 per lighting device 12 which are electrically connected to form at least four strings of LEDs 16 per path 20, 21, more and/or fewer than four LED chips 16 may be provided per lighting device 12, and more and/or fewer than four LED strings may be provided per path 20, 21 on the tile 10. For example, a lighting device 12 may include only one green LED chip 16B, in which case the LEDs may be connected to form three strings per path 20, 21. Likewise, in some embodiments, the two green LED chips in a lighting device 12 may be connected in series to one another, in which case there may only be a single string of green LED chips per path 20, 22. Further, a tile 10 may include only a single path 20 instead of plural paths 20, 21 and/or more than two paths 20, 21 may be provided on a single tile 10.

Figure 4A:
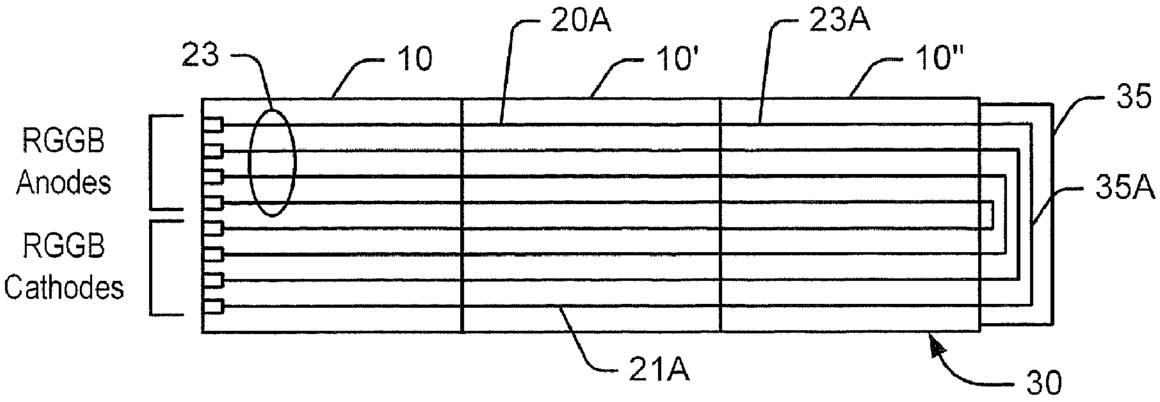
FIG. 4A is a front view of a bar assembly including multiple solid state lighting tiles in accordance with some embodiments of the invention.

Multiple tiles 10 may be assembled to form a larger lighting bar assembly 30 as illustrated in FIG. 4A. As shown therein, a bar assembly 30 may include two or more tiles 10, 10', 10" connected end-to-end. Accordingly, referring to FIGS. 3 and 4A, the cathode contacts 24 of the first path 20 of the leftmost tile 10 may be electrically connected to the anode contacts 22 of the first path 20 of the central tile 10', and the cathode contacts 24 of the first path 20 of the central tile 10' may be electrically connected to the anode contacts 22 of the first path 20 of the rightmost tile 10", respectively. Similarly, the anode contacts 26 of the second path 21 of the leftmost tile 10 may be electrically connected to the cathode contacts 28 of the second path 21 of the central tile 10', and the anode contacts 26 of the second path 21 of the central tile 10' may be electrically connected to the cathode contacts 28 of the second path 21 of the rightmost tile 10", respectively.

Furthermore, the cathode contacts 24 of the first path 20 of the rightmost tile 10" may be electrically connected to the anode contacts 26 of the second path 21 of the rightmost tile 10" by a loopback connector 35. For example, the loopback connector 35 may electrically connect the cathode 24A of the string 20A of blue LED chips 16A of the first path 20 of the rightmost tile 10" with the anode 26A of the string 21A of blue LED chips of the second path 21 of the rightmost tile 10". In this manner, the string 20A of the first path 20 may be connected in series with the string 21A of the second path 21 by a conductor 35A of the loopback connector 35 to form a single string 23A of blue LED chips 16. The other strings of the paths 20, 21 of the tiles 10, 10', 10" may be connected in a similar manner.

The loopback connector 35 may include an edge connector, a flexible wiring board, or any other suitable connector. In addition, the loop connector may include printed traces formed on/in the tile 10.

While the bar assembly 30 shown in FIG. 4A is a one dimensional array of tiles 10, other configurations are possible. For example, the tiles 10 could be connected in a two-dimensional array in which the tiles 10 are all located in the same plane, or in a three dimensional configuration in which the tiles 10 are not all arranged in the same plane. Furthermore the tiles 10 need not be rectangular or square, but could, for example, be hexagonal, triangular, or the like.

Figure 4B:
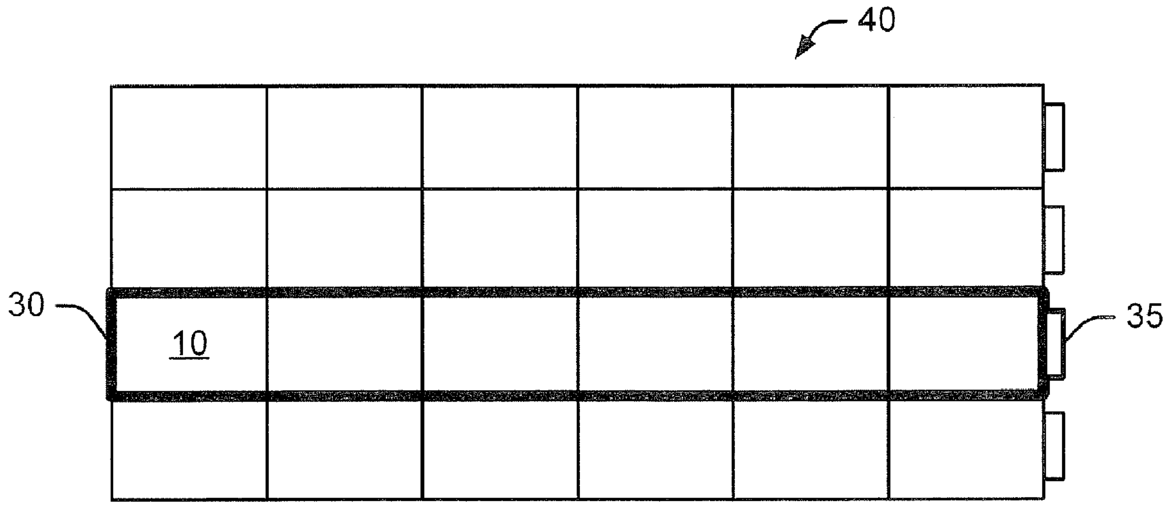
FIG. 4B is a front view of a lighting panel in accordance with some embodiments of the invention including multiple bar assemblies.

Referring to FIG. 4B, in some embodiments, a plurality of bar assemblies 30 may be combined to form a lighting panel 40, which may be used, for example, as a backlighting unit (BLU) for an LCD display. As shown in FIG. 4B, a lighting panel 40 may include four bar assemblies 30, each of which includes six tiles 10. The rightmost tile 10 of each bar assembly 30 includes a loopback connector 35. Accordingly, each bar assembly 30 may include four strings 23 of LEDs (i.e. one red, two green and one blue).

In some embodiments, a bar assembly 30 may include four LED strings 23 (one red, two green and one blue). Thus, a lighting panel 40 including nine bar assemblies may have 36 separate strings of LEDs. Moreover, in a bar assembly 30 including six tiles 10 with eight solid state lighting elements 12 each, an LED string 23 may include 48 LEDs connected in serial.

For some types of LEDs, in particular blue and/or green LEDs, the forward voltage (Vf) may vary by as much as +/−0.75V from a nominal value from chip to chip at a standard drive current of 20 mA. A typical blue or green LED may have a Vf of 3.2 Volts. Thus, the forward voltage of such chips may vary by as much as 25%. For a string of LEDs containing 48 LEDs, the total Vf required to operate the string at 20 mA may vary by as much as +/−36V.

Accordingly, depending on the particular characteristics of the LEDs in a bar assembly, a string of one light bar assembly (e.g., the blue string) may require significantly different operating power compared to a corresponding string of another bar assembly. These variations may significantly affect the color and/or brightness uniformity of a lighting panel that includes multiple tiles 10 and/or bar assemblies 30, as such Vf variations may lead to variations in brightness and/or hue from tile to tile and/or from bar to bar. For example, current differences from string to string may result in large differences in the flux, peak wavelength, and/or dominant wavelength output by a string. Variations in LED drive current on the order of 5% or more may result in unacceptable variations in light output from string to string and/or from tile to tile. Such variations may significantly affect the overall color gamut, or range of displayable colors, of a lighting panel.

In addition, the light output characteristics of LED chips may change during their operational lifetime. For example, the light output by an LED may change over time and/or with ambient temperature.

In order to provide consistent, controllable light output characteristics for a lighting panel, some embodiments of the invention provide a lighting panel having two or more serial strings of LED chips. An independent current control circuit is provided for each of the strings of LED chips. Furthermore, current to each of the strings may be individually controlled, for example, by means of pulse width modulation (PWM) and/or pulse frequency modulation (PFM). The width of pulses applied to a particular string in a PWM scheme (or the frequency of pulses in a PFM scheme) may be based on a pre-stored pulse width (frequency) value that may be modified during operation based, for example, on a user input and/or a sensor input.

Figure 5:
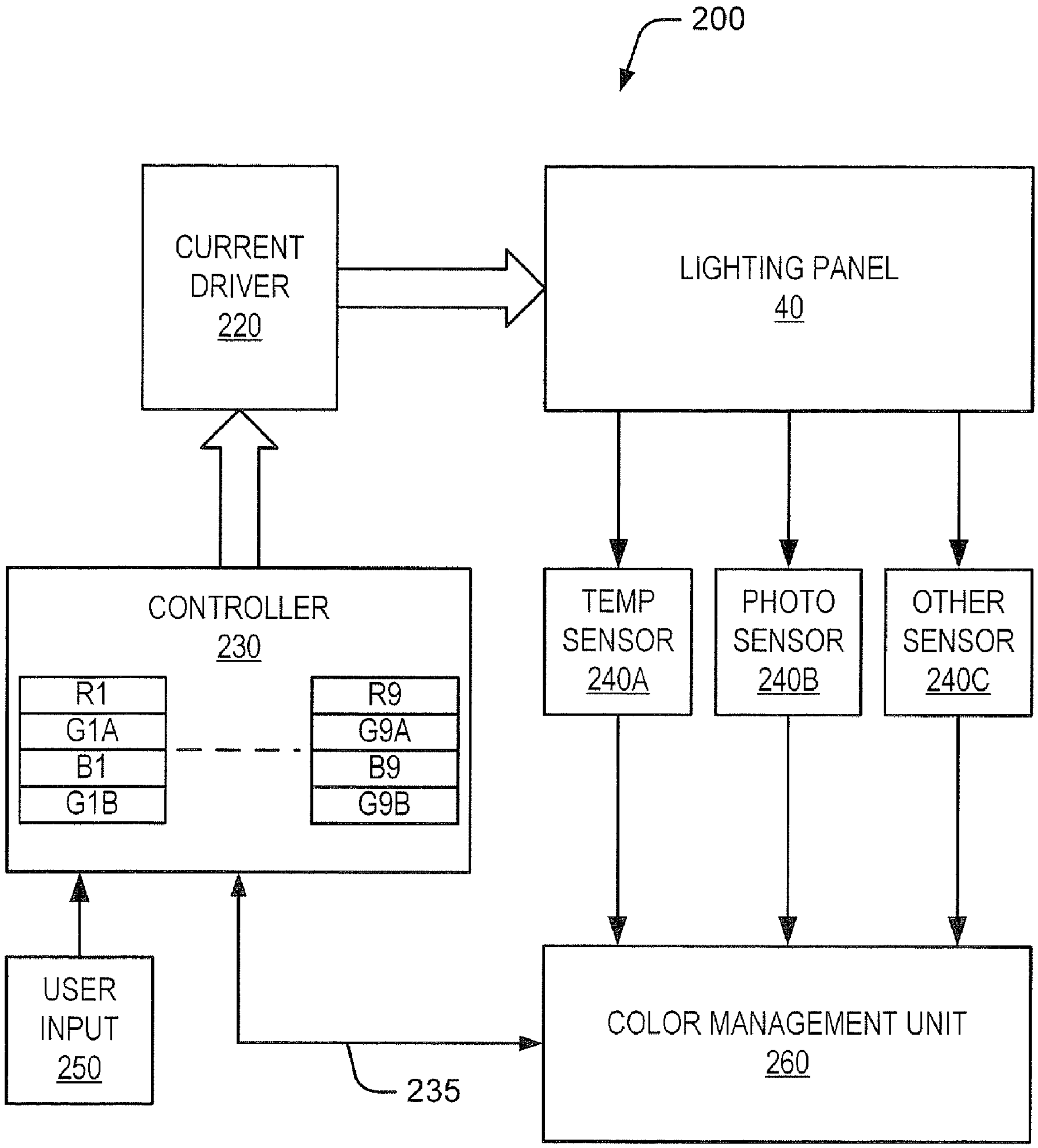
FIG. 5 is a schematic block diagram illustrating a lighting panel system in accordance with some embodiments of the invention.

Accordingly, referring to FIG. 5, a lighting panel system 200 is shown. The lighting panel system 200, which may be a backlight for an LCD display panel, includes a lighting panel 40. The lighting panel 40 may include, for example, a plurality of bar assemblies 30, which, as described above, may include a plurality of tiles 10. However, it will be appreciated that embodiments of the invention may be employed in conjunction with lighting panels formed in other configurations. For example, some embodiments of the invention may be employed with solid state backlight panels that include a single, large area tile.

In particular embodiments, however, a lighting panel 40 may include a plurality of bar assemblies 30, each of which may have four cathode connectors and four anode connectors corresponding to the anodes and cathodes of four independent strings 23 of LEDs each having the same dominant wavelength. For example, each bar assembly 30 may have a red string, two green strings, and a blue string, each with a corresponding pair of anode/cathode contacts on one side of the bar assembly 30. In particular embodiments, a lighting panel 40 may include nine bar assemblies 30. Thus, a lighting panel 40 may include 36 separate LED strings.

A current driver 220 provides independent current control for each of the LED strings 23 of the lighting panel 40. For example, the current driver 220 may provide independent current control for 36 separate LED strings in the lighting panel 40. The current driver 220 may provide a constant current source for each of the 36 separate LED strings of the lighting panel 40 under the control of a controller 230. In some embodiments, the controller 230 may be implemented using an 8-bit microcontroller such as a PIC18F8722 from Microchip Technology Inc., which may be programmed to provide pulse width modulation (PWM) control of 36 separate current supply blocks within the driver 220 for the 36 LED strings 23.

Pulse width information for each of the 36 LED strings 23 may be obtained by the controller 230 from a color management unit 260, which may in some embodiments include a color management controller such as the Agilent HDJD-J822-SCR00 color management controller.

The color management unit 260 may be connected to the controller 230 through an I2C (Inter-Integrated Circuit) communication link 235. The color management unit 260 may be configured as a slave device on an I2C communication link 235, while the controller 230 may be configured as a master device on the link 235. I2C communication links provide a low-speed signaling protocol for communication between integrated circuit devices. The controller 230, the color management unit 260 and the communication link 235 may together form a feedback control system configured to control the light output from the lighting panel 40. The registers R1-R9, etc., may correspond to internal registers in the controller 230 and/or may correspond to memory locations in a memory device (not shown) accessible by the controller 230.

The controller 230 may include a register, e.g. registers R1-R9, G1A-G9A, B1-B9, G1B-G9B, for each LED string 23, i.e. for a lighting unit with 36 LED strings 23, the color management unit 260 may include at least 36 registers. Each of the registers is configured to store pulse width information for one of the LED strings 23. The initial values in the registers may be determined by an initialization/calibration process. However, the register values may be adaptively changed over time based on user input 250 and/or input from one or more sensors 240A-C coupled to the lighting panel 40.

The sensors 240A-C may include, for example, a temperature sensor 240A, one or more photosensors 240B, and/or one or more other sensors 240C. In particular embodiments, a lighting panel 40 may include one photosensor 240B for each bar assembly 30 in the lighting panel. However, in other embodiments, one photosensor 240B could be provided for each LED string 30 in the lighting panel. In other embodiments, each tile 10 in the lighting panel 40 may include one or more photosensors 240B.

In some embodiments, the photosensor 240B may include photo-sensitive regions that are configured to be preferentially responsive to light having different dominant wavelengths. Thus, wavelengths of light generated by different LED strings 23, for example a red LED string 23A and a blue LED string 23C, may generate separate outputs from the photosensor 240B. In some embodiments, the photosensor 240B may be configured to independently sense light having dominant wavelengths in the red, green and blue portions of the visible spectrum. The photosensor 240B may include one or more photosensitive devices, such as photodiodes. The photosensor 240B may include, for example, an Agilent HDJD-S831-QT333 tricolor photo sensor.

Sensor outputs from the photosensors 240B may be provided to the color management unit 260, which may be configured to sample such outputs and to provide the sampled values to the controller 230 to adjust the register values for corresponding LED strings 23 to correct variations in light output on a string-by-string basis. In some embodiments, an application specific integrated circuit (ASIC) may be provided on each tile 10 along with one or more photosensors 240B in order to pre-process sensor data before it is provided to the color management unit 260. Furthermore, in some embodiments, the sensor output and/or ASIC output may be sampled directly by the controller 230.

The photosensors 240B may be arranged at various locations within the lighting panel 40 in order to obtain representative sample data. Alternatively and/or additionally, light guides such as optical fibers may be provided in the lighting panel 40 to collect light from desired locations. In that case, the photosensors 240B need not be arranged within an optical display region of the lighting panel 40, but could be provided, for example, on the back side of the lighting panel 40. Further, an optical switch may be provided to switch light from different light guides which collect light from different areas of the lighting panel 40 to a photosensor 240B. Thus, a single photosensor 240B may be used to sequentially collect light from various locations on the lighting panel 40.

The user input 250 may be configured to permit a user to selectively adjust attributes of the lighting panel 40, such as color temperature, brightness, hue, etc., by means of user controls such as input controls on an LCD panel.

The temperature sensor 240A may provide temperature information to the color management unit 260 and/or the controller 230, which may adjust the light output from the lighting panel on a string-to-string and/or color-to-color basis based on known/predicted brightness vs. temperature operating characteristics of the LED chips 16 in the strings 23.

Various configurations of photosensors 240B are shown in FIGS. 6A-6D. For example, in the embodiments of FIG. 6A, a single photosensor 240B is provided in the lighting panel 40. The photosensor 240B may be provided at a location where it may receive an average amount of light from more than one tile/string in the lighting panel.

Figure 6A:
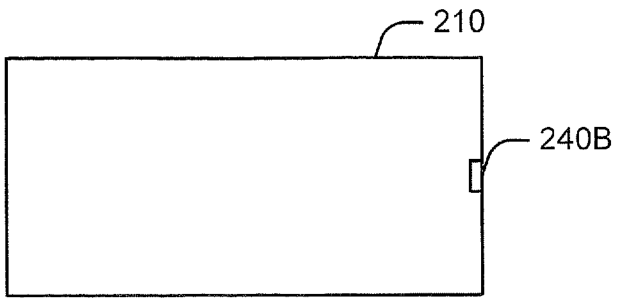
FIGS. 6A-6D are a schematic diagrams illustrating possible configurations of photosensors on a lighting panel in accordance with some embodiments of the invention.
Figure 6B:
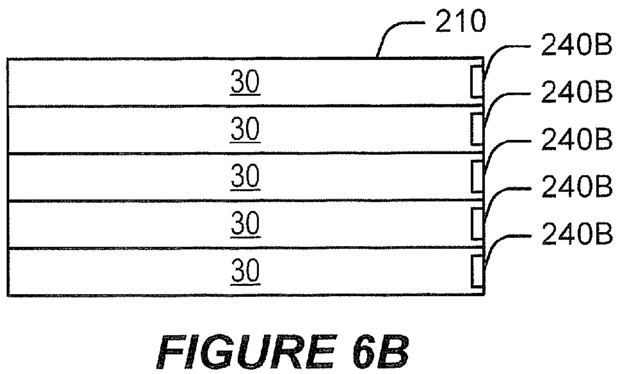

In order to provide more extensive data regarding light output characteristics of the lighting panel 40, more than one photosensor 240B may be used. For example, as shown in FIG. 6B, there may be one photosensor 240B per bar assembly 30. In that case, the photosensors 240B may be located at ends of the bar assemblies 30 and may be arranged to receive an average/combined amount of light emitted from the bar assembly 30 with which they are associated.

Figure 6C:
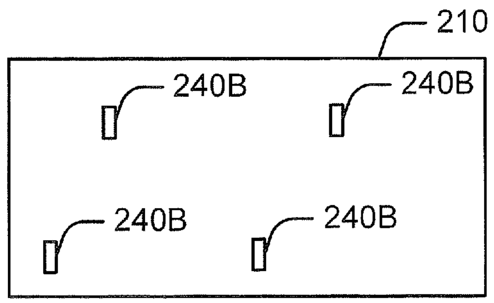
Figure 6D:
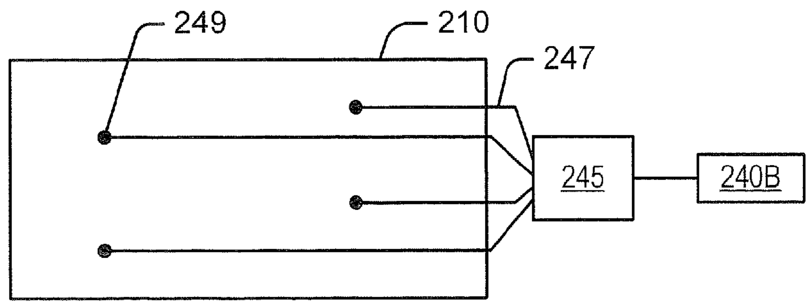

As shown in FIG. 6C, photosensors 240B may be arranged at one or more locations within a periphery of the light emitting region of the lighting panel 40. However in some embodiments, the photosensors 240B may be located away from the light emitting region of the lighting panel 40, and light from various locations within the light emitting region of the lighting panel 40 may be transmitted to the sensors 240B through one or more light guides. For example, as shown in FIG. 6D, light from one or more locations 249 within the light emitting region of the lighting panel 40 is transmitted away from the light emitting region via light guides 247, which may be optical fibers that may extend through and/or across the tiles 10. In the embodiments illustrated in FIG. 6D, the light guides 247 terminate at an optical switch 245, which selects a particular guide 247 to connect to the photosensor 240B based on control signals from the controller 230 and/or from the color management unit 260. It will be appreciated, however, that the optical switch 245 is optional, and that each of the light guides 245 may terminate at a photosensor 240B. In further embodiments, instead of an optical switch 245, the light guides 247 may terminate at a light combiner, which combines the light received over the light guides 247 and provides the combined light to a photosensor 240B. The light guides 247 may extend across partially across and/or through the tiles 10. For example, in some embodiments, the light guides 247 may run behind the panel 40 to various light collection locations and then run through the panel at such locations. Furthermore, the photosensor 240B may be mounted on a front side of the panel (i.e. on the side of the panel 40 on which the lighting devices 16 are mounted) or on a reverse side of the panel 40 and/or a tile 10 and/or bar assembly 30.

Figure 7:
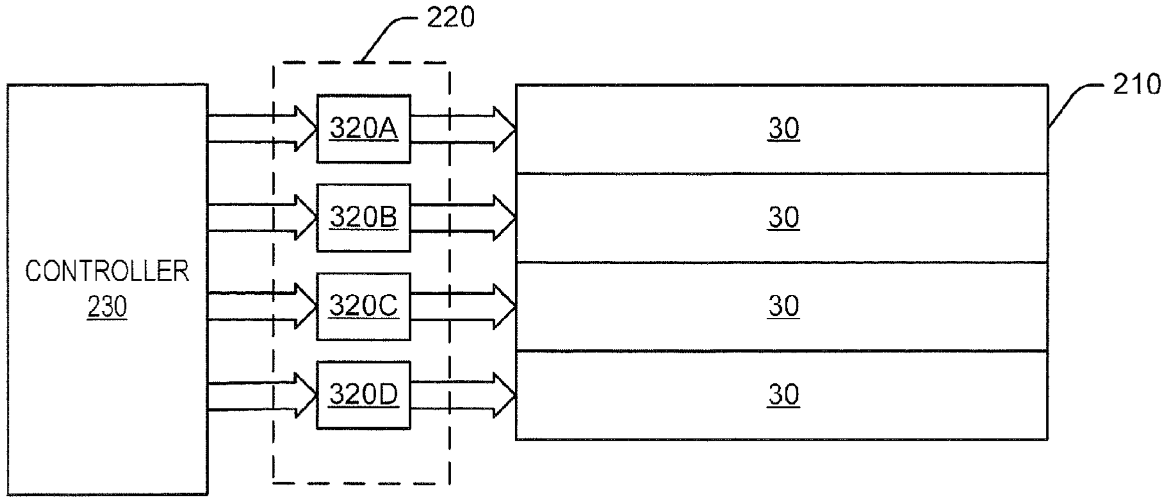
FIGS. 7 and 8 are schematic diagrams illustrating elements of a lighting panel system according to some embodiments of the invention.
Figure 8:
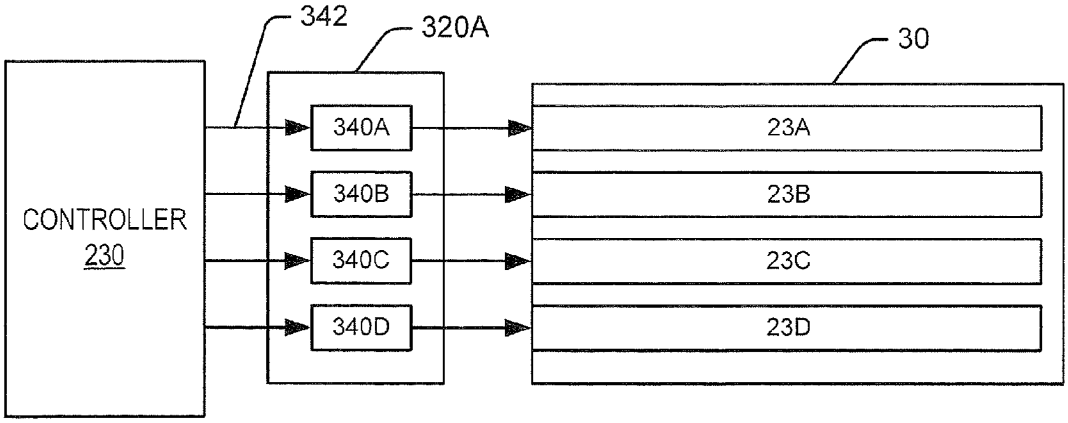

Referring now to FIG. 7, a current driver 220 may include a plurality of bar driver circuits 320A-320D. One bar driver circuit 320A-320D may be provided for each bar assembly 30 in a lighting panel 40. In the embodiments shown in FIG. 7, the lighting panel 40 includes four bar assemblies 30. However, in some embodiments the lighting panel 40 may include nine bar assemblies 30, in which case the current driver 220 may include nine bar driver circuits 320. As shown in FIG. 8, in some embodiments, each bar driver circuit 320 may include four current supply circuits 340A-340D, i.e., one current supply circuit 340A-340D for each LED string 23A-23D of the corresponding bar assembly 30. Operation of the current supply circuits 340A-340B may be controlled by control signals 342 from the controller 230.

The current supply circuits 340A-340B are configured to supply current to the corresponding LED strings 13 while a pulse width modulation signal PWM for the respective strings 13 is a logic HIGH. Accordingly, for each timing loop, the PWM input of each current supply circuit 340 in the driver 220 is set to logic HIGH at the first clock cycle of the timing loop. The PWM input of a particular current supply circuit 340 is set to logic LOW, thereby turning off current to the corresponding LED string 23, when a counter in the controller 230 reaches the value stored in a register of the controller 230 corresponding to the LED string 23. Thus, while each LED string 23 in the lighting panel 40 may be turned on simultaneously, the strings may be turned off at different times during a given timing loop, which would give the LED strings different pulse widths within the timing loop. The apparent brightness of an LED string 23 may be approximately proportional to the duty cycle of the LED string 23, i.e., the fraction of the timing loop in which the LED string 23 is being supplied with current.

An LED string 23 may be supplied with a substantially constant current during the period in which it is turned on. By manipulating the pulse width of the current signal, the average current passing through the LED string 23 may be altered even while maintaining the on-state current at a substantially constant value. Thus, the dominant wavelength of the LEDs 16 in the LED string 23, which may vary with applied current, may remain substantially stable even though the average current passing through the LEDs 16 is being altered. Similarly, the luminous flux per unit power dissipated by the LED string 23 may remain more constant at various average current levels than, for example, if the average current of the LED string 23 were being manipulated using a variable current source.

The value stored in a register of the controller 230 corresponding to a particular LED string may be based on a value received from the color management unit 260 over the communication link 235. Alternatively and/or additionally, the register value may be based on a value and/or voltage level directly sampled by the controller 230 from a sensor 240.

In some embodiments, the color management unit 260 may provide a value corresponding to a duty cycle (i.e. a value from 0 to 100), which may be translated by the controller 230 into a register value based on the number of cycles in a timing loop. For example, the color management unit 260 indicates to the controller 230 via the communication link 235 that a particular LED string 23 should have a duty cycle of 50%. If a timing loop includes 10,000 clock cycles, then assuming the controller increments the counter with each clock cycle, the controller 230 may store a value of 5000 in the register corresponding to the LED string in question. Thus, in a particular timing loop, the counter is reset to zero at the beginning of the loop and the LED string 23 is turned on by sending an appropriate PWM signal to the current supply circuit 340 serving the LED string 23. When the counter has counted to a value of 5000, the PWM signal for the current supply circuit 340 is reset, thereby turning the LED string off.

In some embodiments, the pulse repetition frequency (i.e. pulse repetition rate) of the PWM signal may be in excess of 60 Hz. In particular embodiments, the PWM period may be 5 ms or less, for an overall PWM pulse repetition frequency of 200 Hz or greater. A delay may be included in the loop, such that the counter may be incremented only 100 times in a single timing loop. Thus, the register value for a given LED string 23 may correspond directly to the duty cycle for the LED string 23. However, any suitable counting process may be used provided that the brightness of the LED string 23 is appropriately controlled.

The register values of the controller 230 may be updated from time to time to take into account changing sensor values. In some embodiments, updated register values may be obtained from the color management unit 260 multiple times per second.

Furthermore, the data read from the color management unit 260 by the controller 230 may be filtered to limit the amount of change that occurs in a given cycle. For example, when a changed value is read from the color management unit 260, an error value may be calculated and scaled to provide proportional control ("P"), as in a conventional PID (Proportional-Integral-Derivative) feedback controller. Further, the error signal may be scaled in an integral and/or derivative manner as in a PID feedback loop. Filtering and/or scaling of the changed values may be performed in the color management unit 260 and/or in the controller 230.

In some embodiments, calibration of a display system 200 may be performed by the display system itself (i.e. self-calibration), for example, using signals from photosensors 240B. However, in some embodiments of the invention, calibration of a display system 200 may be performed by an external calibration system.

The user input 250 may specify a color point that is to be displayed by the lighting panel 40. In order to improve the overall performance of the system, it may be desirable to restrict the gamut of colors that may be displayed by the lighting panel 40. This may be particularly important for closed loop control mode in which large numbers of calculations maybe performed in a calibration process.

Figure 9A:
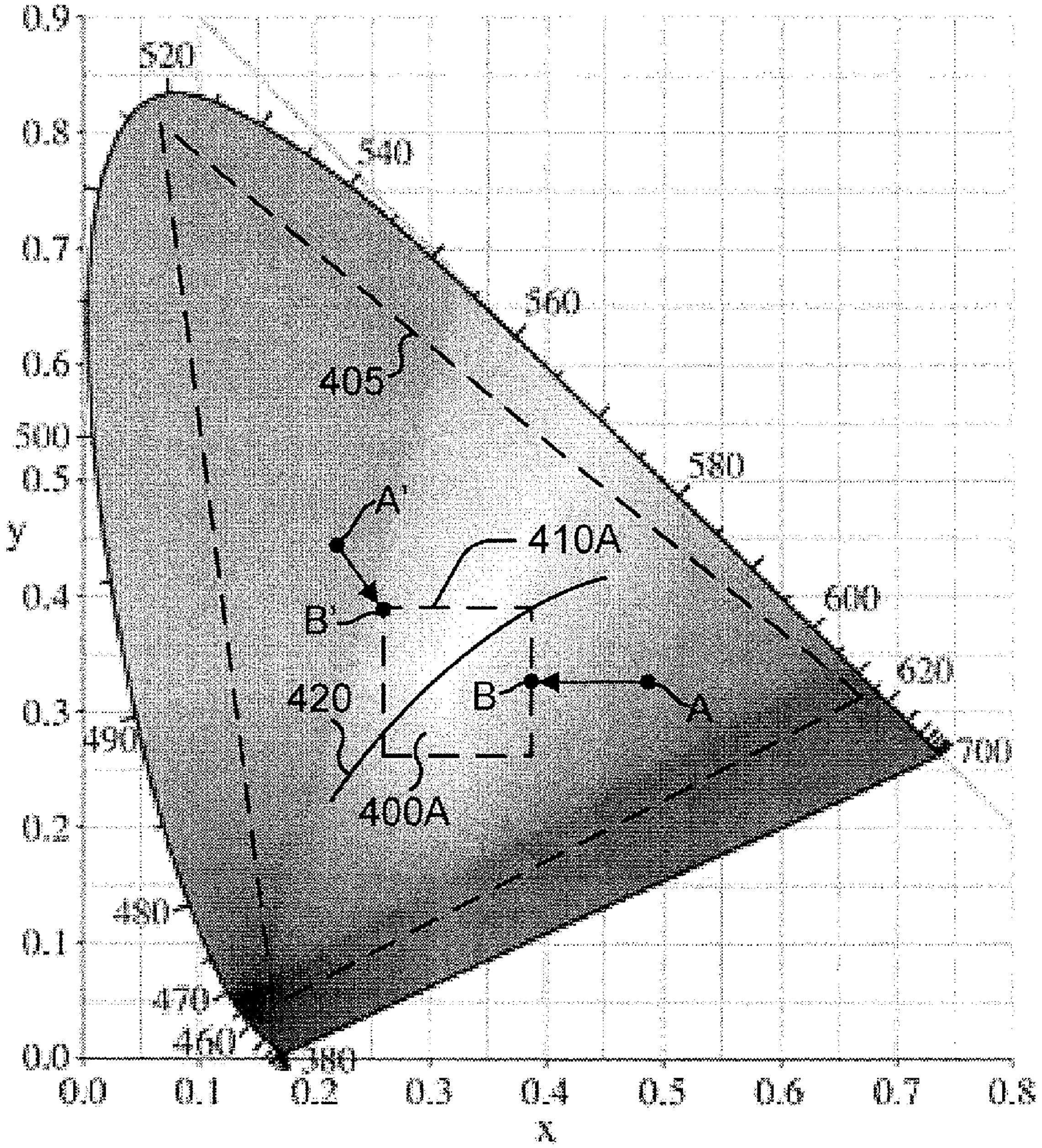
FIGS. 9A-9D are a graphs of a CIE color chart illustrating certain aspects of the invention.

For example, FIG. 9A is an approximate representation of a 1931 CIE chromaticity diagram. The 1931 CIE chromaticity diagram is a two-dimensional color space in which all visible colors are uniquely represented by a set of (x,y) coordinates. Other two-dimensional color spaces are known in the art.

Referring to FIG. 9A, fully saturated (i.e. pure) colors fall on the outside edge of the 1931 CIE chromaticity diagram, as indicated by the wavelength numbers running from 380 nm to 700 nm on the chart. Fully unsaturated light, which is white, is found near the center of the chart. A blackbody radiation curve 420 (shown as a partial approximation in FIG. 9A) plots the color point of light emitted by a blackbody radiator at various temperatures. The blackbody radiation curve 420 runs through the "white" region of the CIE diagram. Accordingly, some "white" points may be associated with particular color temperatures.

An exemplary actual gamut of a lighting panel system 200, that is, the range of colors that could potentially be displayed by the lighting panel system 200, is shown in FIG. 9A as the triangle 405. The actual gamut is determined by the wavelength and saturation of the LED light sources used in the backlight 40. The CIE chromaticity diagram shown in FIG. 9A also shows a possible limited gamut or region 400A for a lighting panel system 200 according to some embodiments of the invention.

The region 400A may be defined as a region in which the x-coordinates and the y-coordinates fall within a defined range. In some embodiments, the defined range may include a rectangle. For example, the x coordinate may be restricted such that x is greater than or equal to a first limit ($x \geqq xlim1$) and x is less than or equal to a second limit ($x \leqq xlim2$). Similarly, the y coordinate may be restricted such that y is greater than or equal to a first limit ($y \geqq ylim1$) and y is less than or equal to a second limit ($y \leqq ylim2$).

In particular, the region 400A illustrated in FIG. 9A is bounded by the rectangle 410A defined by the following equations:

$$0.26 \leqq x \leqq 0.38 \quad (1)$$

$$0.26 \leqq y \leqq 0.38 \quad (2)$$

If the user requests, for example via the user input 250, a color point outside the region 400A (such as point A), the coordinates of the point selected by the user may be automatically truncated to the closest point within/on the rectangle 410A (e.g. point B). In this case, the x-coordinate of the requested point A would be reduced to 0.38, so that the actual color point (point B) would be at the edge of the rectangle 410A.

In the example illustrated in FIG. 9A, only the x-coordinate of point A is outside the acceptable range defined by Equations (1) and (2). Thus, the modified color point B may be obtained by limiting only the x-coordinate of the requested color point A. In comparison, both the x- and y-coordinates of a requested color point A' are outside the acceptable range defined by the region 400A. Thus, both the x- and y-coordinates of the requested color point A' may be modified such that the modified color point B' may lie at a corner of the rectangle 410A.

The region 400A encompassed by the rectangle 410A may include a desirable region of the blackbody curve for a white point for an LCD backlight. However, other regions besides those defined by the rectangle 410A could be chosen.

Figure 9B:
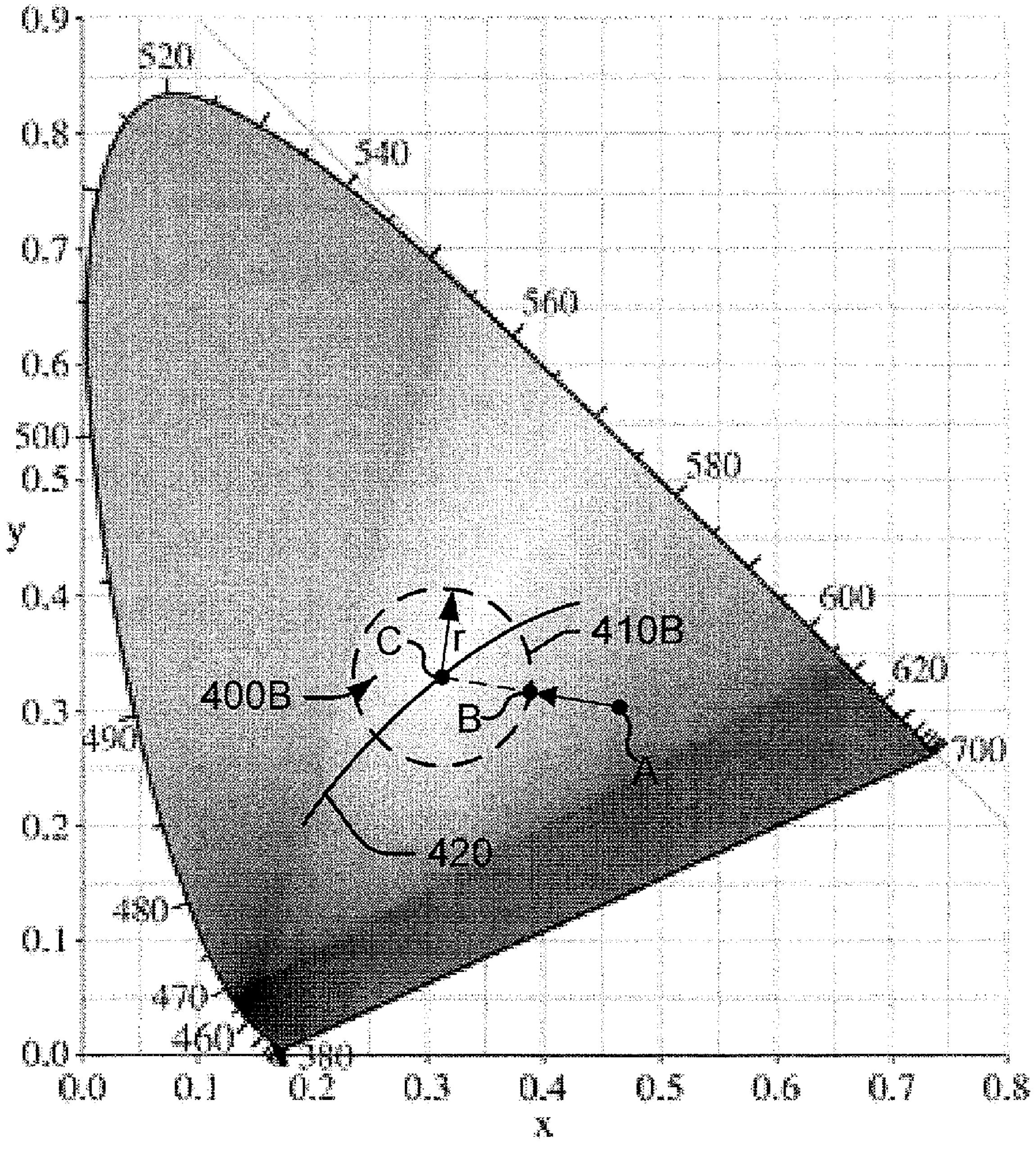

Furthermore, the restricted region may be defined other ways besides a box. For example, as shown in FIG. 9B, a restricted region 400B may be defined by a circle 410B as all color points within a predetermined distance (r) from a reference color point C. If the user requests a color point outside the region 400B (such as point A), the coordinates of the point selected by the user may be translated to the closest point within/on the circle 410B (e.g. point B). In some cases, the requested color point may be moved along a line directed from the specified color point A to the central color point C, until the target color point just reaches the edge of the region 400B at point B, so that the modified color point (point B) would be at the edge of the circle 410B.

Figure 9C:
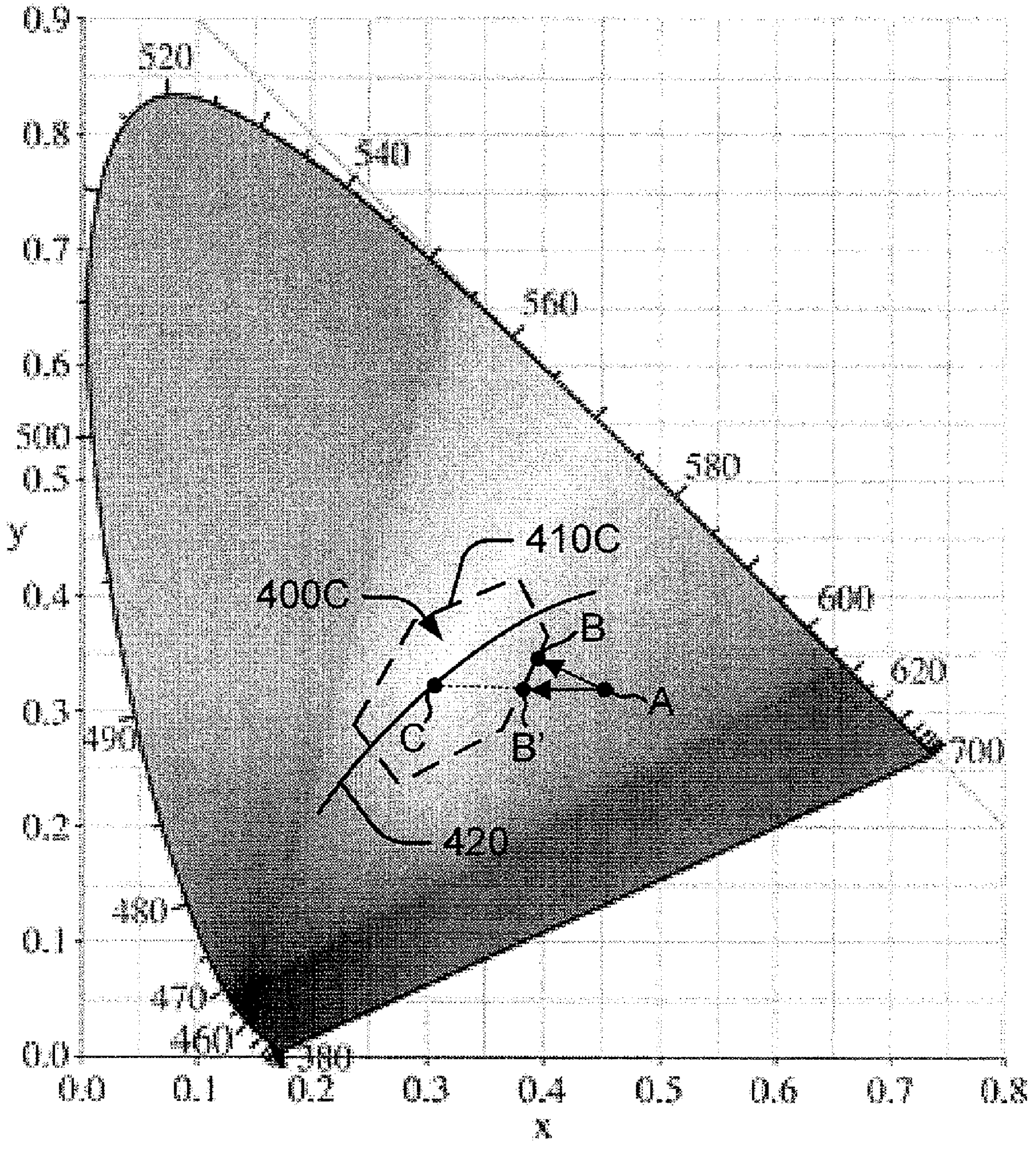

Referring to FIG. 9C, a restricted region 400C may be defined by a regular or irregular polygon 410C. If the user requests a color point outside the region 400C (such as point A), the coordinates of the point selected by the user may be translated to the closest point within/on the polygon 410C (e.g. point B). In some cases, the requested color point may be moved from the specified color point A toward the closest point on the polygon 410C, until the target color point just reaches the edge of the region 400C at point B, so that the actual color point (point B) would be at the edge of the polygon 410C. In some embodiments, the color point may be moved toward a reference color point (e.g. point C) until the color point is within/on the polygon 410C, e.g. at point B'.

Figure 9D:
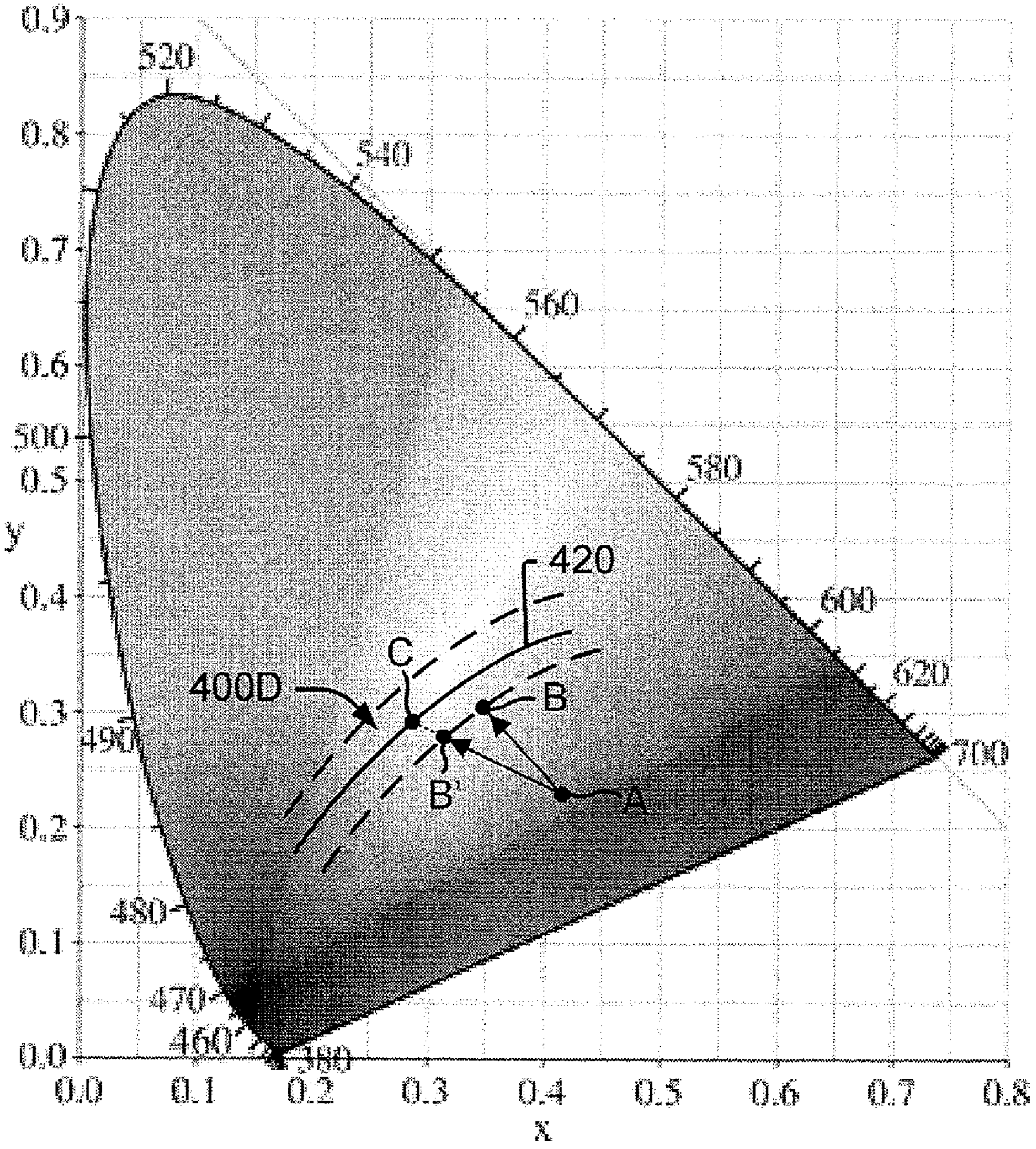

Referring to FIG. 9D, a restricted region 400D may be defined as all color points within a predetermined distance from the blackbody radiation curve 420. If the user requests a color point outside the region 400D (such as point A) that defines all points within a predetermined distance from the blackbody radiation curve 420, the coordinates of the point selected by the user may be moved toward the closest point on the blackbody radiation curve 420 until the color point is within the predetermined distance from the blackbody radiation curve 420 (e.g. point B). In some embodiments, the color point may be moved toward a reference color point (e.g. point C) until the color point is within a predetermined distance from the blackbody radiation curve 420, e.g. at point B'.

Other criteria may be used to define the extent of a restricted region, including any combination of the above described criteria. For example, a restricted region may be defined as all color points within a predetermined distance from the blackbody radiation curve 420 and within a predefined distance of a defined color point, all color points within a predetermined distance from the blackbody radiation curve 420 and having an x-coordinate within a predetermined interval on the 1931 CIE chromaticity diagram (e.g. $0.260<x<0.380$), etc.

Figure 10:
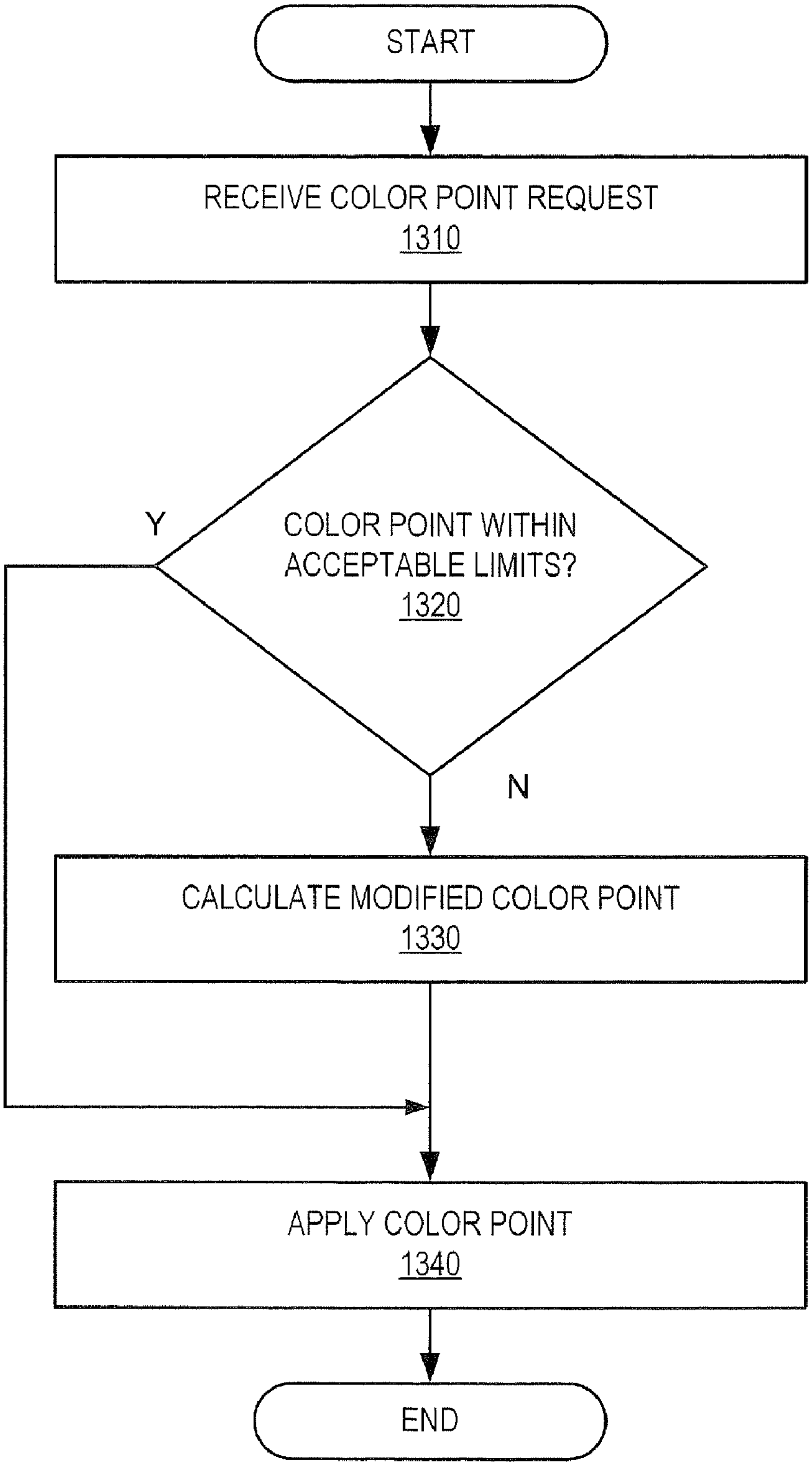
FIG. 10 is a flowchart illustrating systems and/or methods according to some embodiments of the invention.

A flowchart of operations is shown in FIG. 10. As illustrated therein, a color point request is received by the controller 230, for example, via the user input 250 (Block 1310). Color point requests may be received by the controller 230 from other sources, such as from a computer system unit to which the display 200 is attached. The controller 230 analyzes the requested color point and determines if the color point is within acceptable limits (Block 1320). For example, the controller 230 may determine if the requested color point falls within a restricted region 400, such as a box or other polygon, within a predetermined distance from a specified color point, within a predetermined distance from the blackbody radiation curve, etc.

If the requested color point is not within an acceptable limit, the controller 230 calculates a modified color point based on the requested color point (Block 1330). The original or modified color point is then applied by the controller 230 to the lighting panel 40 (Block 1340).

In some embodiments, the system may permit the user to select only from among predetermined color setpoints (e.g., the D65 setpoint, the D55 setpoint, etc.) and/or from predetermined color temperatures. Predetermined setpoints have been included in conventional LCD displays monitors. However, in a conventional LCD display, that functionality is not implemented by changing the color point of the backlight, but rather is implemented by changing the duty cycles of the LCD shutters. For example, in a conventional LCD, the color setpoint may be adjusted by altering the relative duty cycle of the LCD shutters of one color versus the duty cycle of the shutters of another color to effect an apparent change in the color point of the display. However, the conventional approach may reduce the efficiency and/or the brightness of the display, since one of the colors may be dimmed relative to another color. Some embodiments of the present invention may permit a user to directly change the color setpoint of the backlight without having to alter the operation of the LCD shutters, which may reduce the complexity of the display and/or may increase the efficiency of the display.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of controlling a backlight unit including a plurality of solid state light emitting devices, comprising:

receiving a request to set a color point of the backlight unit at a requested color point;

determining if the requested color point is within an acceptable range;

in response to the requested color point being outside the acceptable range, selecting a modified color point in response to the requested color point; and setting a color point of the backlight unit at the modified color point.

2. The method of claim 1, wherein the acceptable range is defined with reference to a two-dimensional color space.

3. The method of claim 2, wherein the acceptable range is defined as a rectangle within the two-dimensional color space.

4. The method of claim 3, wherein the color space is represented by a 1931 CIE chromaticity diagram, and wherein the acceptable range is defined as a chromaticity point having coordinates (x,y), where $xlim1 \leqq x \leqq xlim2$ and $ylim1 \leqq y \leqq ylim2$.

5. The method of claim 4, wherein $0.26 \leqq x \leqq 0.38$ and $0.26 \leqq y \leqq 0.38$.

6. The method of claim 4, further comprising:

determining if an x-coordinate of the requested color point falls within an acceptable range of x-coordinates; and if the x-coordinate of the requested color point does not fall within the acceptable range of x-coordinates, setting the x-coordinate of the modified color point as the closest x-coordinate in the range of acceptable x-coordinates to the x-coordinate of the requested color point.

7. The method of claim 6, further comprising:

determining if a y-coordinate of the requested color point falls within an acceptable range of y-coordinates; and if the y-coordinate of the requested color point does not fall within the acceptable range of x-coordinates, setting the y-coordinate of the modified color point as the closest y-coordinate in the range of acceptable y-coordinates to the y-coordinate of the requested color point.

8. The method of claim 2, wherein the acceptable range includes color points within a distance r from a reference color point.

9. The method of claim 8, wherein selecting the modified color point comprises translating the requested color point along a line between the modified color point and the reference color point until the translated color point falls within the acceptable range.

10. The method of claim 2, wherein the acceptable range is defined as including color points falling within a region described by a regular or irregular polygon.

11. The method of claim 10, wherein selecting the modified color point comprises translating the requested color point toward a closest point on a surface of the polygon until the translated color point falls within the acceptable range.

12. The method of claim 10, wherein selecting the modified color point comprises translating the requested color point toward a reference color point until the translated color point falls within the acceptable range.

13. The method of claim 2, wherein the acceptable range is defined as color points that are within a predetermined distance from a blackbody radiation curve.

14. The method of claim 13, wherein selecting the modified color point comprises translating the requested color point toward a closest point on the blackbody radiation curve until the translated color point falls within the acceptable range.

15. The method of claim 13, wherein selecting the modified color point comprises translating the requested color point toward a reference color point until the translated color point falls within the acceptable range.

16. A solid state backlight unit, comprising:

a lighting panel comprising a plurality of solid state light emitting devices; and a controller configured to control light output of the solid state light emitting devices, to receive a requested color point for the lighting panel, to determine if the requested color point is within an acceptable range, to select a modified color point in response to the requested color point being outside the acceptable range, and to set a color point of the backlight unit at the modified color point.

17. The solid state backlight unit of claim 16, further comprising:

a photosensor configured to measure a light output of the lighting panel and to provide the light output measurement to the controller in a closed loop control system.

18. The solid state backlight unit of claim 16, wherein the acceptable range is defined to include a circle and/or a polygon within a two-dimensional color space.

19. The solid state backlight unit of claim 18, wherein the controller is configured to select the modified color point by translating the requested color point toward a closest point of the polygon and/or circle until the translated color point falls within the acceptable range.

20. The solid state backlight unit of claim 17, wherein the controller is configured to select the modified color point by translating the requested color point toward a reference color point until the translated color point falls within the acceptable range.

21. A method of controlling a backlight unit including a plurality of solid state light emitting devices, comprising:

receiving a request to set a color point of the backlight unit at a requested color point;

determining if the requested color point is within an acceptable range;

in response to the requested color point being outside the acceptable range, selecting a modified color point in response to the requested color point; and setting a color point of the backlight unit at the modified color point;

wherein the acceptable range is defined by a rectangle within a two-dimensional color space.

22. The method of claim 1, wherein the acceptable range of color points is smaller than an actual color gamut of the backlight unit, and wherein selecting a modified color point comprises selecting a modified color point that is within the acceptable range of color points.

23. The solid state backlight unit of claim 16, wherein the controller is configured to determine if the requested color point is within an acceptable range of color points that is smaller than an actual color gamut of the backlight unit, and to select a modified color point that is within the acceptable range in response to the requested color point being outside the acceptable range.

24. The method of claim 21, wherein the acceptable range of color points is smaller than an actual color gamut of the backlight unit, and wherein selecting a modified color point comprises selecting a modified color point that is within the acceptable range of color points.

* * * * *